United States Patent
Brazeau et al.

(10) Patent No.: US 11,526,551 B2
(45) Date of Patent: Dec. 13, 2022

(54) SEARCH QUERY GENERATION BASED ON AUDIO PROCESSING

(71) Applicant: salesforce.com, inc., San Francisco, CA (US)

(72) Inventors: Colin Brazeau, San Francisco, CA (US); Kevin Wong, San Francisco, CA (US); Joselito Campos Santana, San Francisco, CA (US)

(73) Assignee: SALESFORCE, INC., San Francisco, CA (US)

( * ) Notice: Subject to any disclaimer, the term of this patent is extended or adjusted under 35 U.S.C. 154(b) by 300 days.

(21) Appl. No.: 16/845,889

(22) Filed: Apr. 10, 2020

(65) Prior Publication Data

US 2021/0319067 A1  Oct. 14, 2021

(51) Int. Cl.
*G10L 15/22* (2006.01)
*G06F 16/9032* (2019.01)
*G10L 15/18* (2013.01)
*G10L 15/26* (2006.01)

(52) U.S. Cl.
CPC .... *G06F 16/90332* (2019.01); *G10L 15/1807* (2013.01); *G10L 15/22* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |

(Continued)

*Primary Examiner* — Neeraj Sharma
(74) *Attorney, Agent, or Firm* — Schwabe Williamson & Wyatt

(57) ABSTRACT

Among other things, embodiments of the present disclosure relate to generating search queries based on audio processing. Other embodiments may be described and/or claimed.

16 Claims, 5 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteqee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,747,390 B2 * | 8/2017 | Cooper .................. G06F 40/30 |
| 10,019,434 B1 * | 7/2018 | Taubman ............ G06F 40/253 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0271520 A1 * | 11/2006 | Ragan ................ G06F 16/3334 |
| 2008/0077558 A1 * | 3/2008 | Lawrence ............ G06F 40/131 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0057716 A1 * | 3/2010 | Stefik .................... G06F 16/355 |
| | | 707/E17.108 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0254143 A1 * | 10/2012 | Varma ................... G06F 40/30 |
| | | 707/706 |
| 2012/0290407 A1 | 11/2012 | Hubbard et al. |
| 2013/0212497 A1 | 8/2013 | Zelenko et al. |
| 2013/0218948 A1 | 8/2013 | Jakobson |

(56) References Cited

U.S. PATENT DOCUMENTS

| | | |
|---|---|---|
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0280081 A1* | 9/2014 | Tropin ................ G06F 16/3344 707/723 |
| 2014/0359537 A1 | 12/2014 | Jackobson et al. |
| 2018/0121429 A1* | 5/2018 | Agrawal ............. G06F 16/3326 |
| 2019/0347281 A1* | 11/2019 | Natterer .............. G06K 9/6215 |
| 2020/0089697 A1* | 3/2020 | Tripathi .............. G06F 16/3329 |
| 2021/0019309 A1* | 1/2021 | Yadav .................. G06F 16/248 |
| 2021/0026878 A1* | 1/2021 | Robert Jose ......... G06F 16/907 |
| 2021/0065679 A1* | 3/2021 | Finlay .................... G10L 15/08 |
| 2021/0149901 A1* | 5/2021 | Fonseca de Lima ....................... G06F 16/24522 |
| 2021/0200895 A1 | 7/2021 | Brazeau et al. |
| 2021/0233136 A1 | 7/2021 | Brazeau et al. |
| 2021/0397662 A1* | 12/2021 | Sakakibara ........... G06F 16/906 |

* cited by examiner

SEARCH QUERY GENERATION BASED ON AUDIO PROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate to generating search queries based on audio processing. Other embodiments may be described and/or claimed.

BACKGROUND

Increasingly, users of a variety of computer system platforms (e.g., smartphones and other mobile devices, personal computers, virtual assistant platforms, etc.) perform voice-based searches using audio input. Across all such platforms, it is desirable to increase the accuracy of these searches in order to provide users with the results that are most relevant to their search while minimizing the amount of user input required. Embodiments of the present disclosure address these and other issues.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatuses, computer-implemented methods, and computer-readable storage media for generating search queries based on audio input.

I. System Examples

Figure 1A:
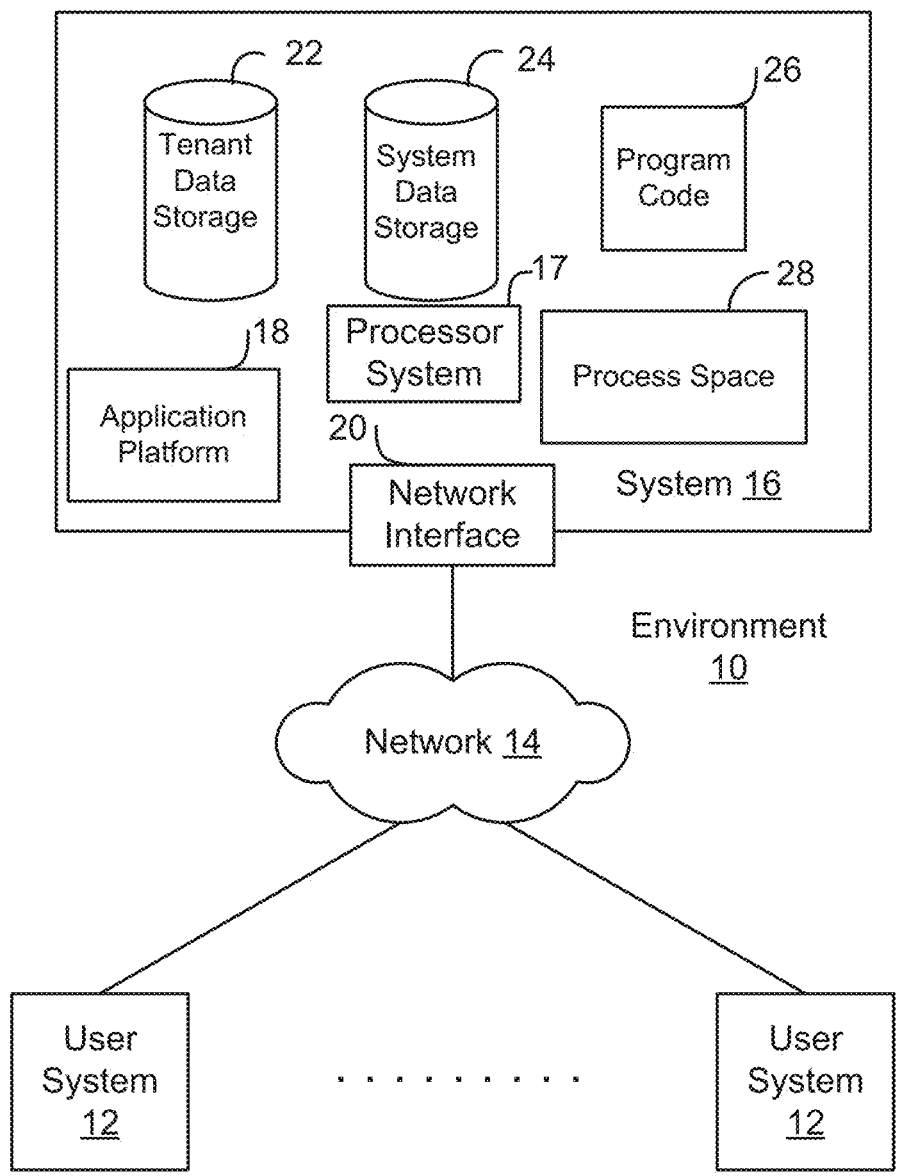
FIG. 1A is a block diagram illustrating an example of an environment in which an on-demand database service can be used according to various embodiments of the present disclosure.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
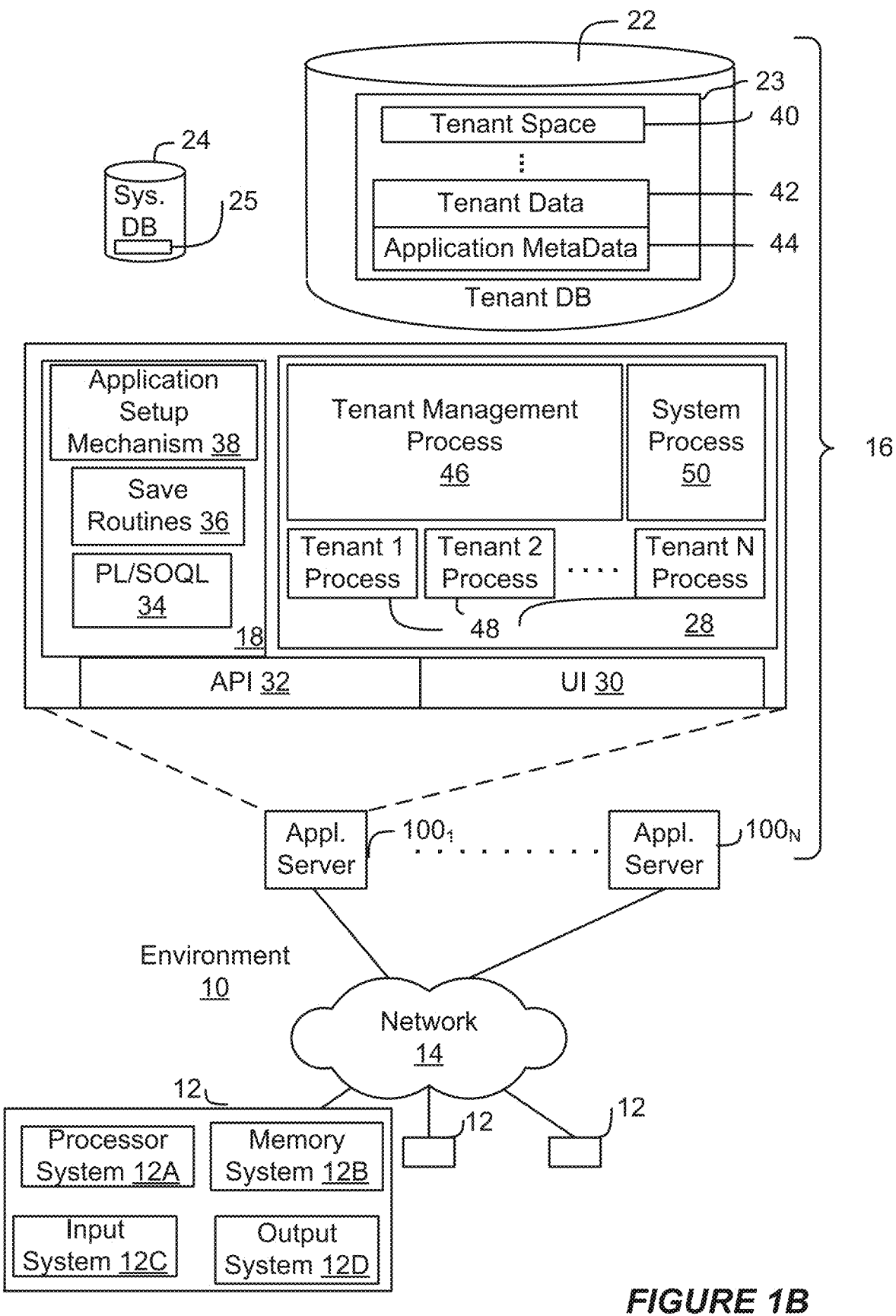
FIG. 1B is a block diagram illustrating examples of implementations of elements of FIG. 1A and examples of interconnections between these elements according to various embodiments of the present disclosure.

FIG. 1B shows a block diagram with examples of implementations of elements of FIG. 1A and examples of interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touch-screen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weismann, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example of a storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Search Query Generation Based on Audio Processing

As noted previously, it is desirable to increase the accuracy of searches based on audio input. For example, in conventional web store applications and search engine applications, a user must typically enter search terms into a search bar, which gives the user an initial set of data. This initial set of data can then be further filtered in subsequent actions. Embodiments of the present disclosure, by contrast, use natural language processing to increase the accuracy of searches by automatically determining which filters should be applied to a search query. Additionally, embodiments of the present disclosure may help to generate more personalized results for different users by biasing the weight of the various portions of audio input from such users.

Figure 2:
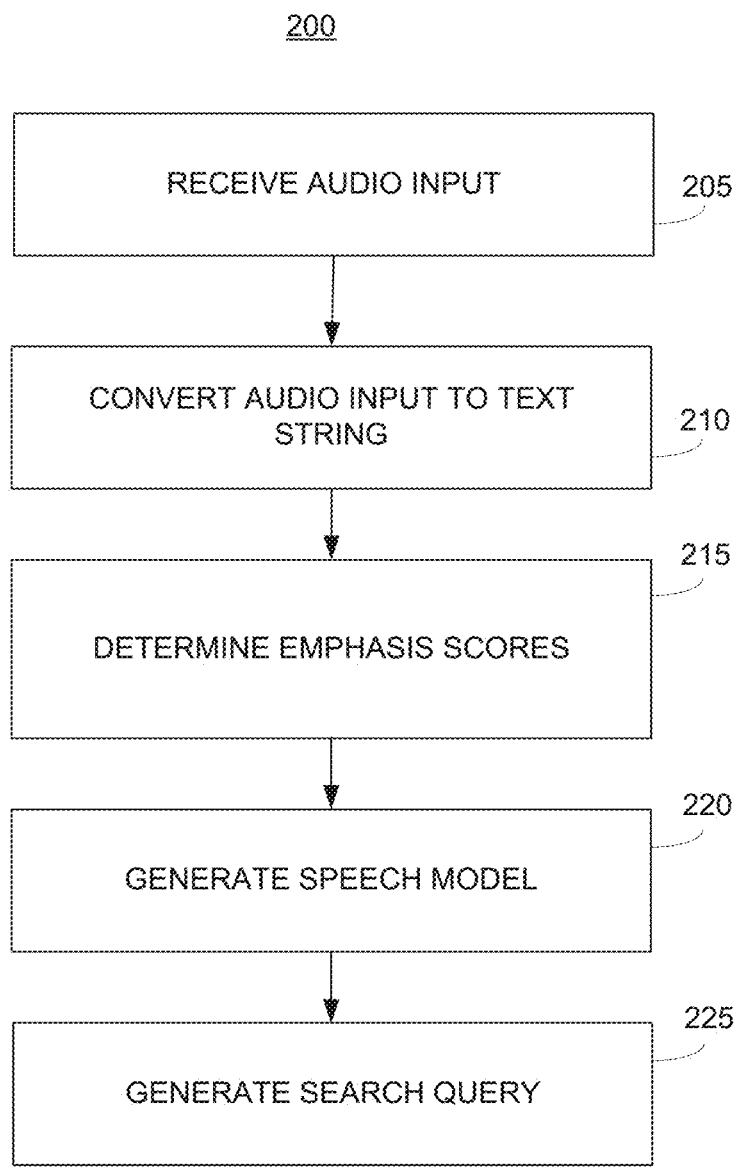
FIG. 2 is a flow diagram illustrating examples of a process according to various embodiments of the present disclosure.

FIG. 2 is a flow diagram illustrating an example of a process 200 according to various aspects of the present disclosure. Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Process 200 may be performed (in whole or in part) by a database computer system (such as database system 16 depicted in FIGS. 1A and 1B), a user computer system (such as user system 12 in FIGS. 1A and 1B), or by a combination of a database system 16 and user system 12 operating in conjunction with each other (e.g., via network 14 in FIGS. 1A and 1B). In this example, process 200 includes receiving audio input associated with a search (205), converting the audio input to a text string having one or more words (210), determining a respective emphasis score for each respective word in the text string (215), generating a speech model for a user providing the audio input (220), and generating a search query (225) based on the generated speech model.

Figure 3:
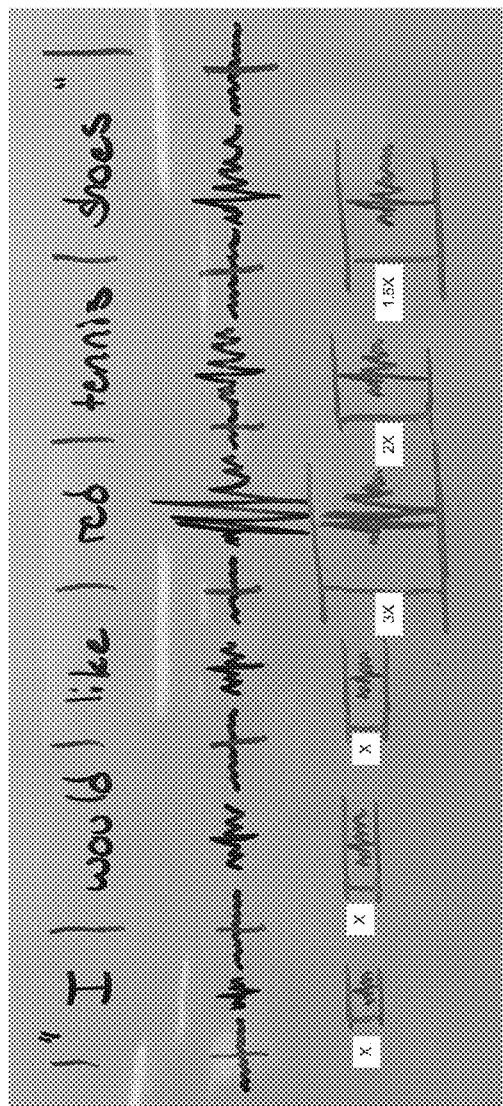
FIG. 3 is a diagram illustrating characteristics of audio input according to various embodiments of the present disclosure.

Audio input may be received (205) via input system 12C (e.g., a microphone or other audio input device) and provided to the database system 16 via user interface 30 in FIG. 1B. FIG. 3 illustrates an example of audio input from a user. In this example, the user states: "I would like red tennis shoes." The input audio is converted into a text string (210) having one or more words (six words in this example). The words in the text string may also be referred to herein as "tokens."

The system may analyze the text string and audio input (e.g., using an audio segment analysis) and determine an emphasis score (215) for each word in the text string. Referring again to FIG. 3, the amplitude of each audio segment (namely, the words and pauses between the words) is represented below each audio segment. A normalized score is then calculated based on the amplitude of each tokenized audio segment.

In the example depicted in FIG. 3, for instance, the amplitude of "I", "would", and "like" each have the same relative amplitude (denoted as "X"). The amplitude of the word "red" is three times higher (denoted as "3X"), the word "tennis" is two times higher ("2X"), and the word "shoes" is 1.5 times higher ("1.5X"). In an example of an embodiment where the emphasis score for each respective word in the text string is calculated based on the relative amplitude of the respective word, the emphasis scores for the words in the example in FIG. 3 may be (from left to right): 1, 1, 1, 3, 2, and 1.5. In this manner, the emphasis score of a first word, "red," is normalized based on the audio amplitude of a second word, "I," in the text string.

In addition (or as an alternative) to amplitude, an analysis of other audio parameters such as tone, inflection, a pause, and/or word stress could be included to determine the emphasis score for each word or token. In some embodiments, the speed at which the phrase was spoken could be used to imply increased or decreased urgency, resulting in a higher (or lower) emphasis score. In some embodiments, an upward inflection in a word, accompanied by a short pause before the word, may imply doubt. For example, in the sentence "I want [pause] ACME(?) red shoes.", where "ACME" is mentioned after a pause with an upward inflection could mean that the brand "ACME" is less of concern for the buyer, resulting in lower emphasis score for the word "ACME."

In some embodiments, the system may generate and maintain a speech model (220) for a user providing the audio input. In some embodiments, the system may use the speech model to determine emphasis scores (215) and/or to generate search queries (225). For example, the system may generate a respective speech model for each respective user providing audio input, and normalize the emphasis scores generated based on the user's speech pattern.

In a particular example, the system may generate a speech model for a first user that tends to shout his audio input, resulting in relatively high amplitudes for each word in the input. The system may identify this pattern of higher amplitudes and adjust the determination of the emphasis scores for the words in the user's audio input (based on amplitude) lower such that every word is not given an excessive emphasis score.

In another example, the system may generate a speech model for a second user that tends to insert relatively long pauses between the words in her audio input. The system may account for these long pauses in order to, for example, still accurately identify the pause/upward inflection situation described above.

Accordingly, the system may generate the speech model for a user based on a first audio input, and modify/update the speech model for the user based on second and subsequent audio inputs from the user. Over time, the system may receive additional sets of audio input from a user and modify the speech model for the user accordingly. In this manner, the system may adjust the speech model for a user to help discern what each particular user considers normal inflection, amplitude, or pause, thereby improving the emphasis score calculations.

The system may generate a search query (225) based on each word in the text string and its respective emphasis score. In some embodiments, the system may perform a grammatical analysis on the text string to identify a respective part-of-speech for each respective word in the text string.

Figure 4:
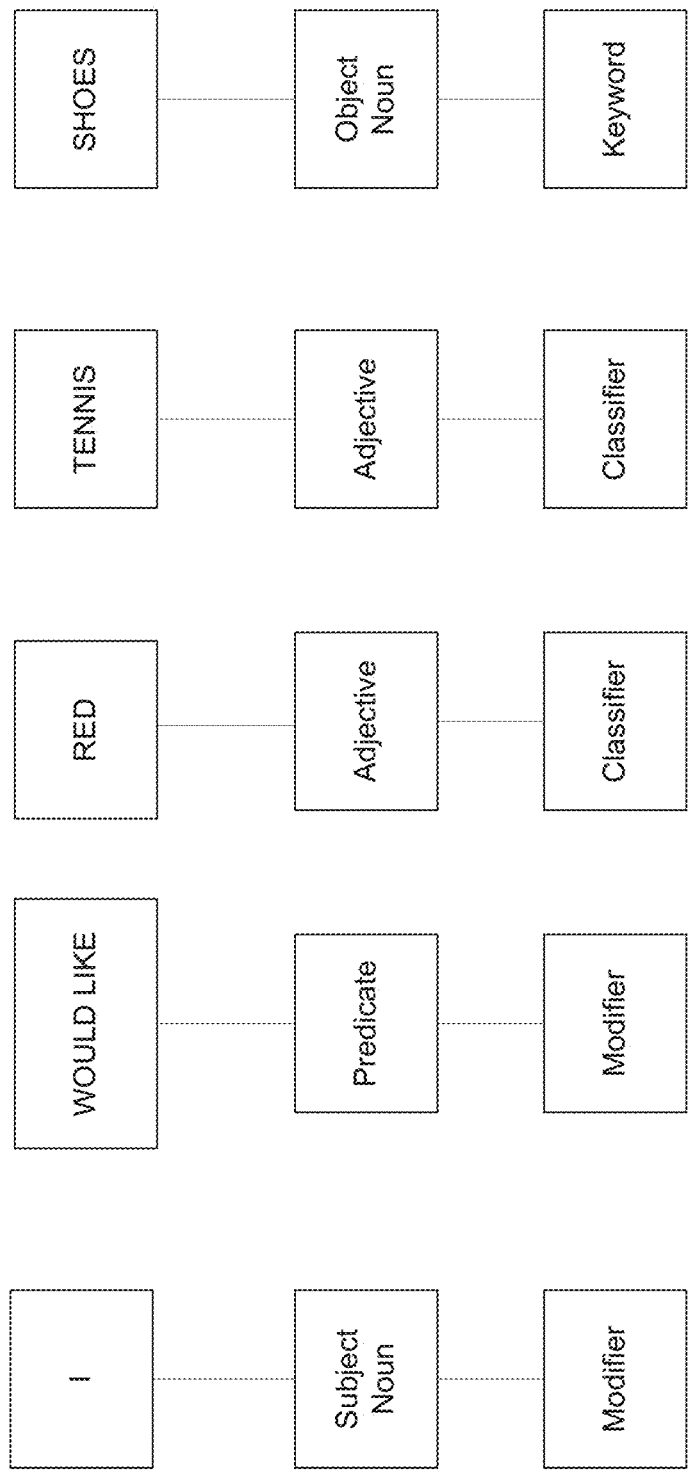
FIG. 4 is a block diagram illustrating the generation of a search query according to various embodiments of the present disclosure.

For example, referring to FIG. 4, the part-of-speech for each word in the text string generated from the audio input depicted in FIG. 3 is determined and indicated below each respective word, namely identifying the subject noun, object noun, predicate, and adjectives as shown. As illustrated in FIG. 4, the subject and object nouns play different roles in the resulting search query. The object noun is the actual entity being searched for in the search query, while the subject noun may imply who the search is intended for. Additionally, the subject noun may be a factor in cases where gender can be applied to the search.

Depending on the sentence structure, the subject noun can differ. For example, compare a first audio input: "I would like red tennis shoes," with a second audio input: "I would like red tennis shoes for my wife." In the first input, "I" is the subject noun (for whom the search result is intended), while in the second input "my wife" is the subject noun.

In some embodiments, the predicate used in the input can be used to determine the amount of variance allowed in a search. For instance, if a user "wants" a specific item, no variance will be applied when conducting a search based on their input, however, if the user "would like" or "wants something near" then more variance can be applied. The amount of variance based on these predicates can also be calculated on a per person basis by tracking past usage of the predicates compared to the outcomes of the search (e.g., did they purchase an item, and if so which one).

Furthermore, the system may utilize prosody associated with the audio input (to include tone, inflection, pauses, or stress analysis) to influence how a search is performed. Emphasis, as mentioned above, could be used to imply increased weight of the emphasized words. The speed at which the phrase was spoken could be used to imply increased urgency, biasing items with a faster arrival time. An upward inflection, accompanied by a short pause before usually implies doubt, so for example, in the sentence "I want [pause] ACME(?) red tennis shoes.", where ACME is mentioned after a pause with an upward inflection could mean that the brand ACME is less of concern for the buyer than the fact that the color is red. In that situation, promotional items with the brand ACME could be ranked higher in the search result to steer the buyer towards a particular brand that the buyer is unsure of In some embodiments, with the object noun identified as the keyword, determine which words in the sentence are used for describing the noun (referred to as "classifiers") and which words can affect the intention of the search (referred to as "modifiers"). The keyword, classifiers, and modifiers for the audio input example from FIG. 3 are indicated along the bottom row in FIG. 4.

In this example, both "red" and "tennis" are considered classifiers, as they are adjectives that describe the keyword. The subject noun "I" does not apply to the object noun, and can potentially be used as a modifier to the query to limit the results for the person performing the search. The predicate "would like" also does not apply to the object noun, and can also potentially be used as a modifier to imply a level of importance to the accuracy of the search results.

In some embodiments, each independent word/token, which has not been assigned some classification, can be grouped based on its perceived intended usage. In the example above, the subject noun and predicate, which were denoted as modifiers, were applied to the keyword. Based on a combination of the predicate used and the scores from audio analysis, the input values are used to generate some initial query input.

For example, the system may analyze the audio input and determine a gender of the user providing the audio input based on characteristics of the input (e.g., tone, pitch, amplitude). In some embodiments, the system may also determine the gender of the user from user profile information stored in conjunction with the user's speech model or from other sources.

Continuing the example from FIGS. 3 and 4, the system may determine from the audio input that the audio was spoken by a male, and in response the system may add the classifier word "men's" to be applied to the keyword in the search query. Additionally, based on the "would like" predicate usage, synonyms for the object noun "shoes" may be added, such as "sandals" and "boots" to reflect an implied reduced level of accuracy in the search input. The system may also increase or decrease the level of importance applied to the query based on grammatical analysis, though for purposes of this example, a standard importance was applied to this portion of the query.

In some embodiments, the system may analyze the classifier words to help enhance the search query, such as by determining a must-match filter term for results of the search query. For example, the classifier "red" may be analyzed using natural language processing (NLP) libraries, to determine the classifier is a color. This information may then be matched against the metadata describing data that can be searched against and a color attribute is found. Based on the significantly higher amplitude-based emphasis score, this "red" value can be applied to the query as a must-match filter against the values found for each item in the index at that color attribute.

In some embodiments, the system may determine a sortation score to be applied to the results of the search query. For example, the "tennis" classifier may be used to adjust the sortation score of matched items via a text relevancy calculation due to its lower audio score compared to other classifiers. Additionally, due to its score and relative importance, the system could determine to use learned adjective words in addition to "tennis," such as "sports" and "active." Such additional terms may also be evaluated and scored for text relevancy during the query.

In some embodiments, the order of the adjective based classifiers may be used to adjust the overall usage (text relevancy vs exact match, for instance) or adjective importance based on their distance from the natural language ordering. Such ordering may vary across different languages. In English, for example, the expected order may be: quantity, quality, size, age, shape, color, proper adjective, and purpose. The system may identify divergences from this ordering to determine how much weight the adjective should have compared to those in the natural order.

In another example, if a user provides the system with audio input for a search of: "red ACME shirt for soccer," putting vocal emphasis on "red" and "ACME," then the system may use those attributes filters rather than just calculating text relevancy. In addition, the system may apply more weight to the color (red) and brand (ACME) attributes when sorting results.

The system may perform a search based on the query using, for example, one or more search engines. The search may be performed automatically by the system or with additional user input. In some embodiments, a sortation solution may be used to analyze each matching (or potentially matching) item to determine a score based on a variety of scoring algorithms. Items may then be sorted based on that calculated score. Search results may be returned to the user (e.g., presented visually on a display screen or audibly over speakers) via a user interface.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer system comprising:
a processor; and
memory coupled to the processor and storing instructions that, when executed by the processor, are configurable to:
receive audio input;
convert the audio input to a text string having one or more words;
determine, based on the audio input, a respective emphasis score for each respective word in the text string, including a determination of a first emphasis score for at least one word of the one or more words based on an audio amplitude of the at least one word; and
generate a search query based on each word in the text string and its respective emphasis score, including applying the at least one word as a filter to the search query such that the at least one word must appear in search results generated from the search query, wherein generating the search query includes performing a grammatical analysis on the text string to identify a respective part-of-speech for each respective word in the text string, wherein the grammatical analysis includes identifying an object noun associated with an entity being searched for in the search query, and wherein generating the search query includes determining, based on one or more classifiers, a sortation score to be applied to results of the search query.

2. The system of claim 1, wherein the first emphasis score is normalized based on an audio amplitude of a second word in the text string.

3. The system of claim 1, wherein the respective emphasis score for each respective word in the text string is determined based on one or more of a tone of each respective word, an inflection of each respective word, or a pause of each respective word.

4. The system of claim 1, wherein the first emphasis score is determined further based on a word stress analysis performed on a first word in the text string.

5. The system of claim 1, wherein an emphasis score for one or more words in the text string is determined based on a speed at which the one or more words are spoken.

6. The system of claim 1, wherein the instructions are further configurable to generate a speech model, based on the audio input, for a user providing the audio input.

7. The system of claim 6, wherein the emphasis score for the one or more words in the text string is further determined based on the speech model.

8. The system of claim 6, wherein the instructions are further configurable to:
receive a second audio input from the user; and
modify the speech model based on the second audio input.

9. The system of claim 1, wherein to perform the grammatical analysis, the instructions are configurable to identify a subject noun associated with an entity for whom a result of the search query is intended.

10. The system of claim 1, wherein to generate the search query, the instructions are configurable to determine, based on the one or more classifiers, a must-match filter term for results of the search query.

11. The system of claim 1, wherein the sortation score is applied to results of the search query using a text relevancy calculation.

12. The system of claim 1, wherein to generate the search query, the instructions are configurable to determine a synonym for the object noun based on the one or more classifiers.

13. The system of claim 1, wherein to generate the search query, the instructions are configurable to determine a level of importance for the search query based on the grammatical analysis.

14. The system of claim 1, wherein, to generate the search query, the instructions are configurable to identify a gender of a user based on the audio input.

15. A tangible, non-transitory computer-readable medium storing instructions that, when executed by one or more processors of a computer system, are operable to cause the computer system to:
receive audio input;
convert the audio input to a text string having one or more words;
determine, based on the audio input, a respective emphasis score for each respective word in the text string, including a determination of a first emphasis score for at least one word of the one or more words based on an audio amplitude of the at least one word; and generate a search query based on each word in the text string and its respective emphasis score, including applying the at least one word as a filter to the search query such that the at least one word must appear in search results generated from the search query, wherein generating the search query includes performing a grammatical analysis on the text string to identify a respective part-of-speech for each respective word in the text string, wherein the grammatical analysis includes identifying an object noun associated with an entity being searched for in the search query, and wherein generating the search query includes determining, based on one or more classifiers, a sortation score to be applied to results of the search query.

16. A method comprising:

receiving, by a computer system, audio input;

converting, by the computer system, the audio input to a text string having one or more words;

determining, by the computer system based on the audio input, a respective emphasis score for each respective word in the text string, including a determination of a first emphasis score for at least one word of the one or more words based on an audio amplitude of the at least one word; and generating, by the computer system, a search query based on each word in the text string and its respective emphasis score, including applying the at least one word as a filter to the search query such that the at least one word must appear in search results generated from the search query, wherein generating the search query includes performing a grammatical analysis on the text string to identify a respective part-of-speech for each respective word in the text string, wherein the grammatical analysis includes identifying an object noun associated with an entity being searched for in the search query, and wherein generating the search query includes determining, based on one or more classifiers, a sortation score to be applied to results of the search query.

\* \* \* \* \*